United States Patent [19]

Spikes

[11] Patent Number: 4,498,829
[45] Date of Patent: Feb. 12, 1985

[54] BIG BALE RETRIEVER AND STACKER

[76] Inventor: Warren W. Spikes, P.O. Box 759, Hugoton, Kans. 67951

[21] Appl. No.: 451,785

[22] Filed: Dec. 21, 1982

[51] Int. Cl.³ .......................................... A01D 87/12
[52] U.S. Cl. ..................................... 414/24.5; 414/44; 414/541; 414/550; 414/555; 414/781
[58] Field of Search ........................ 414/24.5, 24.6, 38, 414/39, 44, 111, 541, 542, 543, 555, 780, 781, 786, 550

[56] References Cited

U.S. PATENT DOCUMENTS

| | | | |
|---|---|---|---|
| 2,509,950 | 5/1950 | Zierke | 414/543 |
| 2,543,302 | 2/1951 | Rossiter | 414/781 X |
| 2,947,425 | 8/1960 | Nichols | 414/543 X |
| 2,954,886 | 10/1960 | Nelson | |
| 3,011,652 | 12/1961 | Falk et al. | 414/543 X |
| 3,251,485 | 5/1966 | Fancher | |
| 3,330,424 | 7/1967 | Grey et al. | |
| 3,515,292 | 6/1970 | Oborny | |
| 3,521,762 | 7/1970 | Walters | |
| 3,572,521 | 3/1971 | Grey et al. | |
| 3,918,595 | 11/1975 | Godfrey et al. | |
| 3,934,734 | 1/1976 | Grey et al. | |
| 3,952,881 | 4/1976 | Knudson | |
| 4,075,719 | 2/1978 | Sullivan | 414/543 X |
| 4,076,138 | 2/1978 | Honomichl, Sr. | |
| 4,091,943 | 5/1978 | Bay-Schmith | |
| 4,259,034 | 3/1981 | Ward et al. | 414/24.6 |
| 4,261,676 | 4/1981 | Balling, Sr. | 414/24.5 |
| 4,329,101 | 5/1982 | Green et al. | 414/24.5 |
| 4,363,583 | 12/1982 | Bontrager | 414/24.5 |
| 4,370,796 | 2/1983 | Wilson | 414/44 X |

FOREIGN PATENT DOCUMENTS

| | | | |
|---|---|---|---|
| 586555 | 11/1959 | Canada | 414/551 |
| 1011297 | 5/1977 | Canada | 414/24.5 |
| 2260280 | 9/1975 | France | 414/38 |
| 2488772 | 2/1982 | France | 414/24.5 |
| 1342281 | 1/1974 | United Kingdom | 414/543 |

*Primary Examiner*—Leslie J. Paperner
*Attorney, Agent, or Firm*—D. A. N. Chase; Michael Yakimo, Jr.

[57] ABSTRACT

A vehicular bale retriever and stacker including a multistage hoist assembly which picks up and stacks a plurality of huge first and second hay bales on a transport platform. The hoist assembly comprises a rigidly reinforced support column having a cylindrical lift member slidable along the column and rotatable about a vertical axis passing therethrough. Pivotally attached to this lift member is a hoist arm having an operable grapple assembly mounted thereto. Operator control of the elevation and rotation of the lift member and the pivotal movement of the hoist arm presents a multistage hoist which enables the operator to maneuver the grapple assembly through generally vertical and horizontal arcs at different elevations, relative to the platform, so as to seize first and second ground-adjacent hay bales and stack the same in the loading area of the transport platform. A ram assembly pushes the stacked hay bales to the rear of the transport platform allowing for subsequent stacking of first and second hay bales in the loading area. Upon reaching a fully loaded capacity the vehicle is driven to a central storage area. The transport platform is then swung to a vertical position which juxtaposes the plurality of first and second hay bales stacked thereon into an elongated vertical stack of hay bales in the bale storage area.

27 Claims, 10 Drawing Figures

BIG BALE RETRIEVER AND STACKER

BACKGROUND OF THE INVENTION

This invention relates to a method and accompanying apparatus for picking up, loading, stacking, transporting and unloading huge bales of crop material, such as hay, and more particularly, to a multistage hoist assembly, incorporated therein, which efficiently achieves the pick up, loading and stacking functions of huge hay bales.

The development of balers for forming huge hay bales in the field has necessitated apparatus to pick up these huge hay bales, weighing approximately 1800 lbs., for subsequent transport to a storage area. An initial response thereto was a simple hoist capable of picking up a single bale from the field for loading onto the associated pickup truck for transport to a storage area. Mobile forklift-type of apparatus are also used to achieve pick up and transport functions of a single hay bale.

Various multiple bale loading and transport devices arose in a desire to improve over single bale-loading and transport capabilities. These devices included grapple, conveyor and scoop-type apparatus for picking up a huge, cylindrical hay bale and loading the same onto a mobile transport platform. Desirous of transporting a plurality of such hay bales, apparatus arose for shifting the previously loaded hay bales away from the loading area of the transport platform so as to allow for an unobstructed loading of a subsequent hay bale thereon. This rearward displacement of a loaded hay bale(s) has been provided either by an overall tilting of the transport platform, to present gravitational forces to the loaded hay bale(s), or by mechanical devices which push or pull a loaded hay bale(s) along the transport platform and to the rear thereof.

To increase the quantity of small hay bales, weighing approximately 80 lbs., that could be loaded and transported from the field to the storage area, apparatus arose to vertically stack these small hay bales on the transport platform. One such device includes an elevating conveyor that scoops up a ground-adjacent hay bale and directs the same into a rectangular assembly area, as defined by four walls operably movable in directions towards and away one another. This operator-controlled wall motion urges a plurality of small hay bales, deposited therebetween, into a loose stack which is subsequently directed towards the rear of the associated transport platform. Also, "bale wagons" have been developed which use various arrangements of tandemly arranged, cooperating bale-loading tables and/or beds so as to achieve a desired stacking pattern of small hay bales thereon.

A computer-controlled hoisting device, associated with a transport platform, is shown in U.S. Pat. No. 4,091,943 issued May 30, 1978. This device picks up small ground-adjacent hay bales and stacks them onto the platform according to a predetermined loading and stacking pattern.

Although assumedly effective in their operation, the aforesaid devices are relatively complex structures and have inherent design limitations therein. The multiple bale loading devices have addressed the pickup and loading of huge cylindrical hay bales, but because of the bale configuration, not the field stacking thereof. Furthermore the known bale stacking devices have been utilized with normal rectangular hay bales and thus have not been particularly designed for use with huge hay bales. Accordingly such apparatus do not efficiently address the functons of huge hay bale pick up, loading and stacking on a transport platform and the attendant problems therewith.

In response thereto, I have invented a method of picking up, loading and stacking huge hay bales on a mobile transport platform as presented by my vehicular bale loader having a novel multistage bale hoist assembly incorporated therein. The bale hoist assembly stacks huge first and second hay bales, having dimensions of approximately 8'L×4'W×4'H and a weight of approximately 1800 lbs., on a vehicular transport platform. This hoist assembly includes an elongated hoist arm, pivotally mounted to a sleeve member longitudinally slidable and rotatable about a support column positioned adjacent the loading end of a chassis-supported transport platform. At the outer end of the hoist arm is mounted an operable grapple device for releasably seizing a hay bale. Hydraulic control of the pivotal motion of the hoist arm and of the rotation of the support column with sleeve member linked thereto, swings the attached grapple device through generally vertical and horizontal arcs relative to the transport platform. Hydraulic control of the longitudinal movement of the rotatable sleeve member with the pivotal hoist arm attached thereto presents a multistage capability to the hoist arm with attendant pivotal and rotatable capabilities.

A first operable stage of the hoist arm, with grapple assembly attached thereto, enables a first ground-adjacent hay bale to be seized and upwardly displaced from the ground, as provided by pivotal movement of the hoist arm, to a height above the transport platform for subsequent horizontal movement, as provided by rotation of the hoist arm, to a point above the transport platform. The first bale is then lowered into contact with the loading area of the transport platform, as provided by pivotal movement of the hoist arm.

A second hay bale is then seized and elevated to a height above the first hay bale as provided by pivotal movement of the hoist arm at its first operable stage and longitudinal displacement of the sleeve member with bale-laden hoist arm to the top of the support column. At this second operable stage, the second hay bale is horizontally swung to a point above the first hay bale for stacking thereon, as provided by rotation and pivotal movement of the hoist arm.

Once stacked, the first and second hay bales are pushed away from the loading area to the rear of the transport platform by a hydraulic ram to allow a subsequent stacking of first and second hay bales in the loading area, as above described. Upon the transport platform reaching a fully loaded capacity, the vehicle is driven to a storage area. A hydraulically-controlled tilting of the transport platform, from the horizontal to the vertical, positions the plurality of horizontally disposed stacks of first and second hay bales into an elongated vertical stack with the rearward-most stack of first and second hay bales forming a base thereof. A grapple assembly at the rear of the transport platform secures this rearward-most stack to preclude undesirable shifting and to juxtapose the first and second hay bales during said platform tilting. The platform is then returned to its horizontal loading position for a subsequent return to the field.

It is therefore a general object of this invention to provide a method and accompanying apparatus for pick up, loading, stacking, transport and unloading of huge hay bales.

Another general object of this invention is to provide a hoist assembly, associated with a transport platform, which provides for pick up, loading and stacking of huge hay bales.

Another object of this invention is to provide a hoist assembly, as aforesaid, having at least first and second stages of operation, relative to said transport platform, for stacking first and second hay bales thereon.

A further object of this invention is to provide a multistage hoist assembly, as aforesaid, for sequentially seizing ground-adjacent hay bales and maneuvering the same through vertical and horizontal arcs, relative to said platform, during each stage of operation to achieve said stacking of first and second hay bales.

Still another object of this invention is to provide a multistage hoist assembly, as aforesaid, having a hoist arm with grapple device operably mounted thereto for seizing said hay bale.

A more particular object of this invention is to provide a multistage hoist assembly with hoist arm, as aforesaid, with said hoist arm longitudinally slidable along a vertical support column and having attendant rotatable and pivotal capabilities, relative to said support column, to provide for a stacking of a ground-adjacent hay bale onto a transport platform during each stage of operation.

A still more particular object of this invention is to provide a multistage hoist assembly with hoist arm, as aforesaid, with the latter pivotally mounted to a sleeve member slidable along a vertical support column and relatively rotatable thereto to provide for selectable stages of pivotal and rotatable movement of said hoist arm.

An important object of this invention is to provide a multistage hoist assembly, as aforesaid, that is rigidly reinforced for use with huge hay bales weighing substantially more than the standard hay bale.

Another particular object of this invention is to provide at least one roller assembly associated with said sleeve member and support column, as aforesaid, to enhance the slidable movement of said sleeve member along the extent of said support column.

Still another particular object of this invention is to provide an alignment device associated with said sleeve member and support column, as aforesaid, to maintain a proper vertical alignment between said support column and sleeve member during the slidable movement of the latter therealong.

A still further particular object of this invention is to provide a multistage hoist assembly, as aforesaid, having a turntable for rotating said support column about its vertical axis for transmission of said rotation, via linkage means, to said sleeve member mounted thereon.

A more particular object of this invention is to associate with said multistage hoist assembly, as aforesaid, a bale transport platform swingable between horizontal and vertical positions with the latter position providing a gravitational unloading of stacks of hay bales thereon.

Another object of this invention is to provide a ram assembly used in cooperation with said platform, as aforesaid, providing for ram-induced movement of stacks of hay bales to the rear of the transport platform Still another object of this invention is to provide a grapple assembly associated with said platform, as aforesaid, which secures at least the rearward-most stacked hay bales during said swingable movement of said platform.

Still another object of this invention is to provide a stablization assembly associated with said platform, as aforesaid, which precludes tilting of said platform member during said bale pick up and loading functions.

Other objects and advantages of this invention will become apparent from the following description taken in connection with the accompanying drawings, wherein is set forth by way of illustration and example, a preferred embodiment of this invention.

DESCRIPTION OF THE PREFERRED EMBODIMENT

Figures 1, 9:
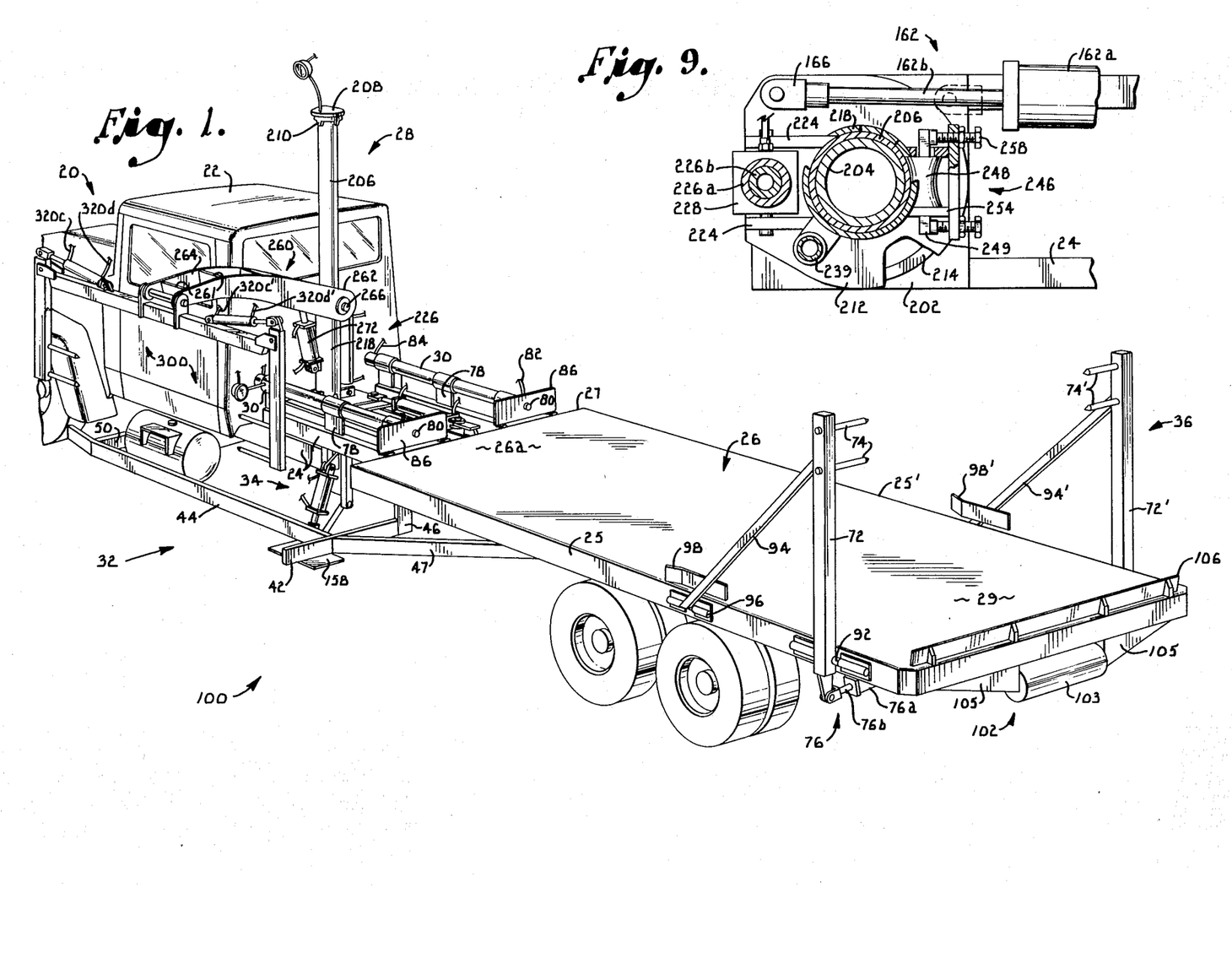
FIG. 1 is a perspective view of the big bale retriever and stacker in a vehicular mode and illustrating the multistage hoist assembly disposed at the travel position to the pick up side of the vehicle.
FIG. 9 is a sectional view, taken along lines 9—9 in FIG. 4, and showing in section the cooperating, cylindrical members of the multistage hoist assembly with a portion of the circumference of the outside cylindrical lift member broken away to illustrate the associated lower roller assembly and mounting flanges.

Generally describing the big bale retriever and loader 100, FIG. 1 illustrates my invention in a vehicular mode as comprising a truck 20 having a cab member 22 and a rearwardly extending vehicle chassis/support framework 24 with a bale transport platform 26 mounted thereon. An upstanding multistage hoist assembly 28 is mounted to the frame 24 intermediate the rear of cab 22 and the platform 26. Also mounted on frame 24, intermediate cab 22 and platform 26, are hydraulic ram assemblies 30. Protruding into the outboard, driver's side of the vehicle 20 is an alignment assembly 32 for providing a proper relative positioning of the truck proper 20, platform 26 and hoist assembly 28 with a ground-adjacent hay bale 40. A stabilization assembly 34, mounted to the underside of the vehicle frame 24, precludes undesirable lateral tipping of the vehicle 20 during bale pick up. Positioned at the rear end of the platform 26 and upwardly extending therefrom is a platform grapple assembly 36 for releasably engaging first and second hay bales 40, 41 stacked therebetween.

Figures 3, 7, 10:
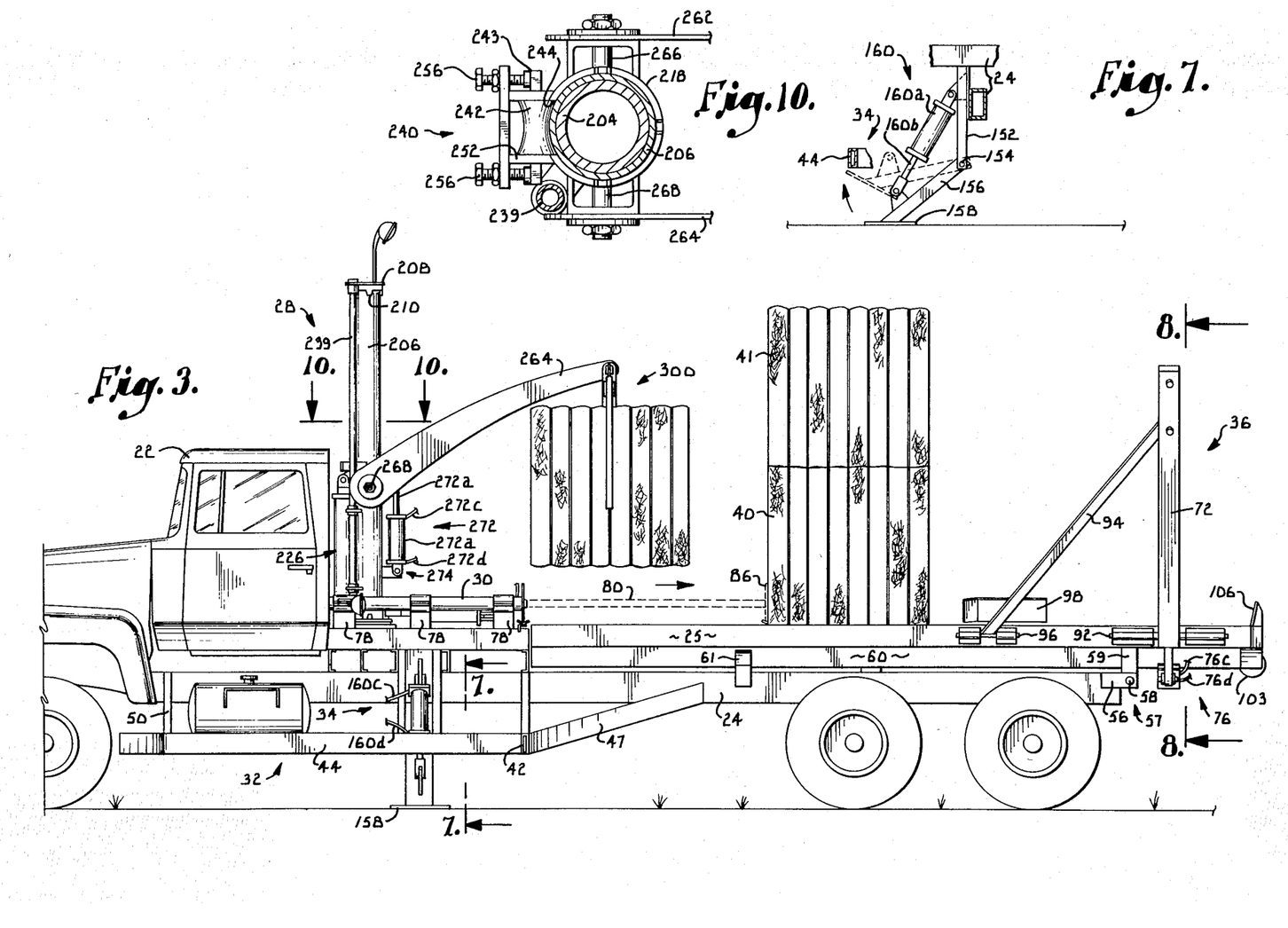
FIG. 3 is a side elevation view showing the hoist assembly during its first operable stage and at a position immediately prior to release of the seized hay bale on the transport platform and further showing in phantom a ram-induced pushing of a stack of hay bales to the rear of the transport platform.
FIG. 7 is a fragmentary elevation view, taken along line 7—7 in FIG. 3, and showing in solid lines the loading mode and in phantom lines the transport mode of the stabilization assembly.
FIG. 10 is a sectional view, taken along lines 10—10 in FIG. 3, and showing in section the cylindrical support columns of the multistage assembly and the relationship of the upper roller assembly to the exterior support column.

Turning more particularly to the drawings, FIGS. 1 and 3 illustrate the bale alignment assembly 32 on the driver's side of the cab 22 and extending into the outboard side thereof. This bale alignment assembly 32 comprises a laterally extending arm member 42, normal to the imaginary longitudinal axis of the vehicle 20, and a longitudinally extending arm member 44, generally parallel to the longitudinal axis of the vehicle 20 and normally attached to the lateral arm 42. Arm member 42 is aligned in an interior parallel relationship relative to the lateral end 27 of transport platform 26 and is held thereat by means of a brace member 46 depending from frame 24. Diagonal strut 47 extends between frame 24 and arm 42 to provide rigidity thereto. Arm member 44, positioned as above described, is aligned with the exterior longitudinal wall 25 of the platform 26 and is held thereat by attachment to frame 24 at its forward end by brace member 50. As such, the alignment assembly 32 presents a type of bale "try square" so that upon abutment of the arm members 42 and 44 with the corresponding longitudinal and lateral sides of the hay bale 40, as provided by driver positioning of the vehicle, a "squared" relationship between the hay bale 40 and the vehicle 20 proper is achieved. This "squaring" properly aligns the hay bale 40 with hoist assembly 28 and the platform 26 for subsequent bale pick up, loading and stacking onto platform 26 as to be subsequently described.

The platform 26 is generally rectangular in configuration with the longitudinal center line/axis thereof aligned with the longitudinal center line/axis of the vehicle 20. The platform is mounted to the vehicle frame 24, at the rear end thereof, by laterally spaced-apart bracket members 57. (Only one bracket 57 is illustrated.) Each bracket member 57 comprises a horizontal flange member 56 longitudinally extending beyond the rear of frame 24. A pivot arm 59 is attached at one end to a depending interior side wall 60 of platform 26 and is pivotally mounted about pivot pin 58 laterally extending through flange 56.

Figures 4, 5:
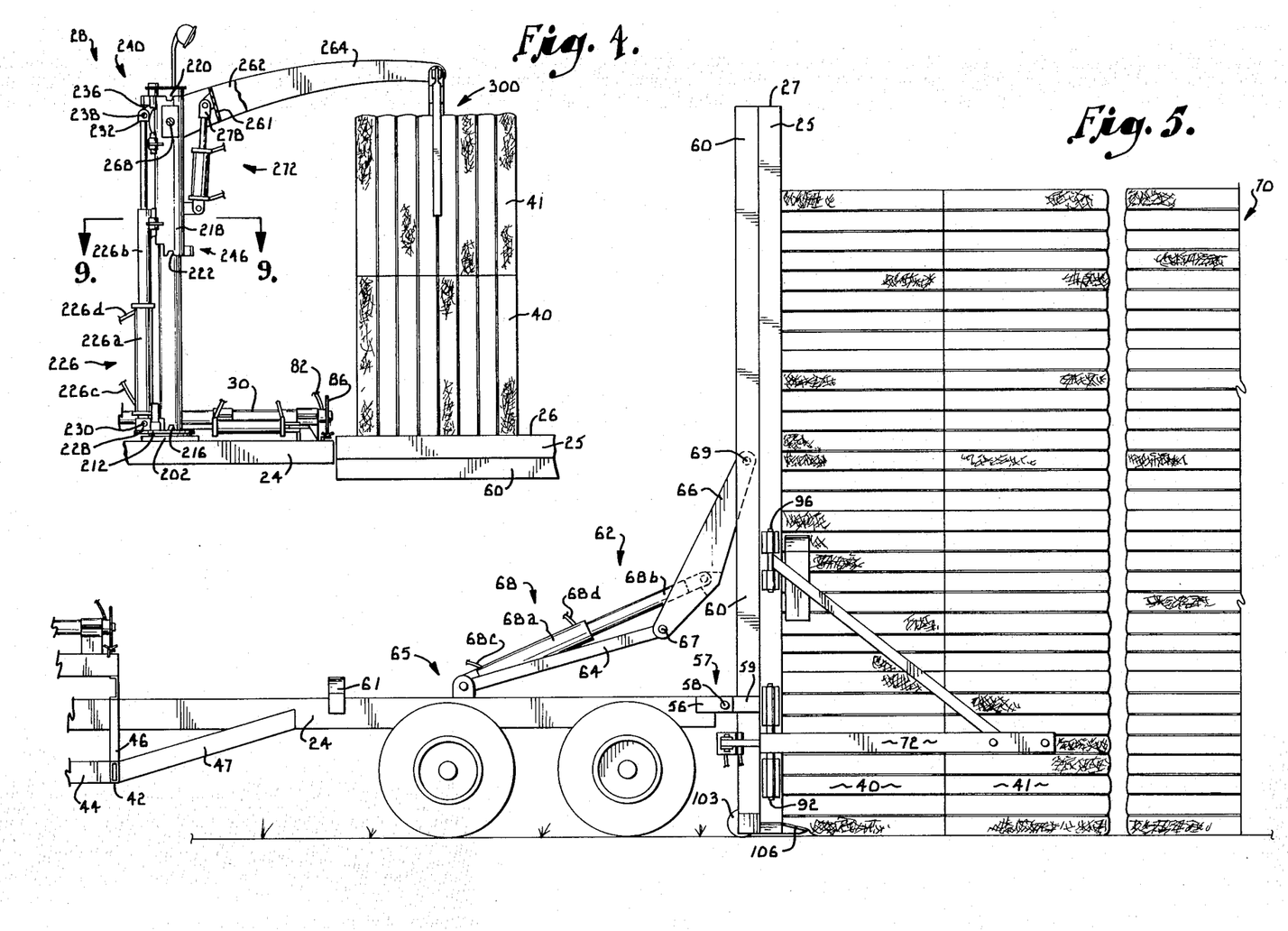
FIG. 4 is a partial side elevation view of the multistage hoist assembly during its second operable stage and at a position stacking a second hay bale onto a previously loaded first hay bale with a portion of the hoist arm broken away to show the hydraulic assembly used to control the pivotal movement of the hoist arm.
FIG. 5 is a side elevation view showing the transport platform in a hydraulically-disposed vertical position so as to vertically stack the platform loaded hay bales in a bale storage area.

Pivotally mounted to the frame member 24 and the underside of the platform proper 26, as shown in FIG. 5, are a pair of side by side hinge assemblies 62. Each hinge assembly 62 (only one assembly 62 is illustrated) comprises a first rod member 64 pivotally mounted at one end thereof to the frame 24 by means of a pivot pin/bracket 65 combination and at the other end to wing member 66 about a pivot pin 67 extending therethrough. The opposed end of wing member 66 is pivotally fastened to the underside of the platform proper 26 about pivot pin 69 fastened thereto. As such, the foldable hinge assemblies 62 provide for swinging movement of the platform 26 through a vertical arc having a first terminal horizontal/loading position, shown in FIG. 3, and a second terminal vertical/discharge position as shown in FIG. 5. The depending interior side walls 60 snap into respective snap flanges 61 mounted on frame 24 to inhibit lateral shifting of platform 26 in its horizontal position.

Swingable movement of platform 26 is operator-controlled by means of a double-action hydraulic piston/cylinder combination 68 in communication with a pressurized fluid source 104 via fluid lines 68c, 68d. Fluid passage and discharge into and from cylinder 68a, via either lines 68c, 68d, is operator-controlled, so as to selectably extend or withdraw piston rod 68b. This reciprocating rod motion is translatable to wing 66 so as to fold or unfold the hinge assembly 62.

Longitudinal movement of the vertically disposed platform proper 26, is enhanced by means of a ground contacting roller assembly 102. Upon vehicle 20 movement the ground contacting roller 103, mounted to the platform 26 by brackets 105, aids in concurrent movement of the vertically disposed platform proper 26.

Normally extending from the surface of platform 26, at the rear or discharge end 29 thereof, is a stop flange 106 for contacting a hay bale 40. Also mounted adjacent the rear end of the platform proper 26 is a grapple assembly 36. The grapple assembly comprises a pair of laterally spaced-apart grapple arms 72 and 72' normally disposed to the surface of platform 26 and swingably mounted thereto about a longitudinally extending pin member 92 fastened to the exterior longitudinal side walls 25, 25' of platform 26. Extending between the top of each arm 72, 72' and the depending walls 25, 25' of platform 26 is a diagonal strut 94, 94'. Each strut 94, 94' is pivotally mounted about a longitudinally extending pin 96 attached to side wall 25, 25'. Also attached to each strut 94, 94', at a position adjacent the platform 26 surface, is a guide flange 98, 98' for channeling hay bales passing therethrough. Laterally extending from each arm 72, 72' is a pair of prong members 74, 74' in a facing relationship one 74 towards the other 74'.

Rotation of each grapple assembly 36 arm member 72, 72' is operator-controlled by means of a double action piston/cylinder combination 76 in communication with a pressurized fluid source 104 via lines 76c, 76d. A controlled fluid passage and discharge into cylinder 76a, via lines 76c, 76d, selectably extends and withdraws piston rod 76b. Upon withdrawal and extension of rod 76b, each arm member 72 and 72' linked thereto is moved between release and seizure positions as respectively shown in solid and phantom lines in FIG. 8. These positions correspond to withdrawal and insertion of the facing prong members 74, 74' into a second hay bale 41 positioned therebetween.

Mounted between the cab 22 and the platform proper 26 are hydraulic ram assemblies 30, each comprising first and second laterally spaced-apart hydraulically powered rams 80 mounted to the main frame 24 by means of longitudinally spaced-apart bracket members 78. Each hydraulic ram 80 is operator-controlled between withdrawn and extendable positions, the latter being shown in phantom in FIG. 3, by means of an encased hydraulically operated piston/cylinder combination (not shown) in communication with fluid source 104 via lines 82, 84. At the end of each ram 80 is a square plate 86 which distributes the ram-induced forces over the contacted bale 40. As shown in FIG. 3 extension of the rams 80 longitudinally displaces the contacting first hay bale 40 and second hay bale 41 stacked thereon away from loading area 26a and to the rear of platform 26.

The stabilization assembly 34, as shown in FIG. 7, comprises a beam member 152 depending from frame 24. Pivotally attached to the beam member 152 about pin 154 is a pod arm 156, having a ground engaging pod 158 at the free end thereof. Movement of the pod 158 from the ground engaging position to a ground-adjacent position, as repsectively shown in solid lines and phantom lines in FIG. 7, and is operator-controlled by means of a double-action piston/cylinder combination 160 in communication with a fluid source 104 via lines 160c, 160d. Fluid passage and discharge into cylinder 160a selectably extends or withdraws rod 160b so as to pivot pod arm 156 and attached pod 158 between its operable and disengaged modes.

Hoist Assembly

The multistage hoist assembly 28 is mounted on frame 24 immediately to the rear of the cab 22 and is medially aligned with platform 26 so that the imaginary longitudinal center line of the platform 26 normally passes therethrough. Offering rigid support to the assembly 28 is an interior column 204 in the form of a reinforced cylinder upwardly extending from a base plate 202, welded to frame 24, to a point above the cab 22. A second column 206 is of a greater cylindrical configuration providing for a nesting of the entire support column 204 therein. Welded to the lower end of the column 206 is an annular turntable 212. Support flanges 224 on turntable 212 are affixed to support column 206 to provide a rigid basal connection thereto. Upon nesting of column 204 within column 206 the turntable 212 lies adjacent base 202 with a bronze bearing member 214 interposed therebetween. Thus, upon rotation of turntable 212, support column 206 is likewise rotated about column 204. A cap member 208 with a downwardly depending lug or tooth 210 is affixed to the top of column 206 with a similar lug 216 upwardly extending from turntable 212 for a purpose to be subsequently described.

An elongated sleeve-like lift member 218, having a length of approximately one-half of the support column 206, is mounted to column 206 in longitudinal movement along the extent thereof and in rotatable movement about the vertical axis passing therethrough. Inserted into the top rim of cylindrical lift 218 is notch 220 for engagement with depending tooth 210 and a notch 222 at the lower rim thereof for engagement with upstanding tooth member 216 for a purpose to be subsequently described.

Control of the longitudinal movement of the lift 218 along the extent of the column 206 is provided by a piston/cylinder 226 assembly in communication with fluid source 104, via lines 226c, 226d. The lower end of cylinder 226a is mounted to the turntable 212 by means of bracket member 228 with pin member 230 extending therethrough. The upper end of piston rod 226b is mounted to the bracket 232 with pin member 238 extending therethrough. A short arm member 236 extends between bracket 228 and a roller assembly 240, associated with lift 218. Accordingly the reciprocating motion of rod 226b, as provided by operator-controlled pressurization of cylinder 226a, via lines 226c, 226d, is transmitted to lift 218 which provides up and down motion of lift 218 along the extent of column 206.

Associated with the lift 218 is the aforesaid upper roller assembly 240 (FIG. 10) having a roller bearing 242 in rolling contact with the surface of column 206 through notch 244 in lift 218. A similar lower roller bearing assembly 246 (FIG. 9) is mounted to the lower extent of lift 218 and likewise has a roller bearing 248 in contact with the exterior support column 206 through a notch in lift 218. Each roller bearing 242, 248 is adjustable along its support bracket 252, 254 and held thereat by abutment of bolts 256, 258 with the ends of the bearing shafts 243, 249 such adjustment compensating for bearing wear. (It is here pointed out that a portion of the sleeve 218, in FIG. 9 has been removed to show the contact of bearing member 248 with support column 206 as well as the above described mounting flanges 224.) These roller bearing assemblies 240, 246 enhance the sliding longitudinal movement of the lift 218 along the extent of support column 206.

Also extending the length of support column 206, but radially displacement therefrom is a rigid alignment rod 239 attached at its lower end to turntable 212 and at its upper end to cap 208. This rod 239 precludes displacement of the lift 218, during its longitudinal movement, to further assure roller bearing contact with column 206 and an enhanced longitudinal movement of lift 218 therealong.

Rotation of the support column 206 about its vertical axis is provided by rotation of the attached turntable 212. As shown in FIG. 9, this rotation is accomplished by a turntable piston/cylinder 162 combination. Cylinder 162a is mounted to the frame member 24 by means of bracket 164 with the end of rod 162b linked to the turntable proper 212 by means of bracket 166 as shown in FIG. 9. Operator-controlled flow of a pressurized fluid to and from cylinder 162a, via lines 162c, 162d in communication with fluid source 104, corresponds to extension and withdrawal of rod 162b. Accordingly extension of piston rod 162b rotates turntable 212 in a counterclockwise direction with withdrawal of piston rod 162b rotates turntable 212 in a counterclockwise direction and support column 206 connected thereto. Engagement of the notches 220 and 222 with the respective depending and upstanding teeth members 210, 216 transmits the rotation of the support column 206 to lift 218.

Pivotally mounted to the lift 218 about a horizontal axis is a hoist arm 260 having first and second side walls 262, 264 with support ribs 261 extending therebetween. The inner end of each sidewall 262, 264 is pivotally mounted about a horizontal pin member 266, 268 fastened to opposed sides of the lift 218. This pivotal movement of the hoist arm 260 about the respective pin members 266, 268 is controlled by a piston/cylinder 272 combination with the lower end of cylinder 272a being mounted to lift 218 by means of bracket 274. The end of piston rod 272b is mounted to support flange 261 by means of bracket 278, as best shown in FIG. 4. Extension and withdrawal of rod 272b provides a concurrent pivotal movement of the hoist arm 260 about the horizontally disposed pin members 266, 268. This rod 272b movement is operator-controlled by means of pressurization of cylinder 272a via fluid lines 272c, 272d in communication with the cylinder 272a and fluid source 104.

Figures 2, 6, 8:
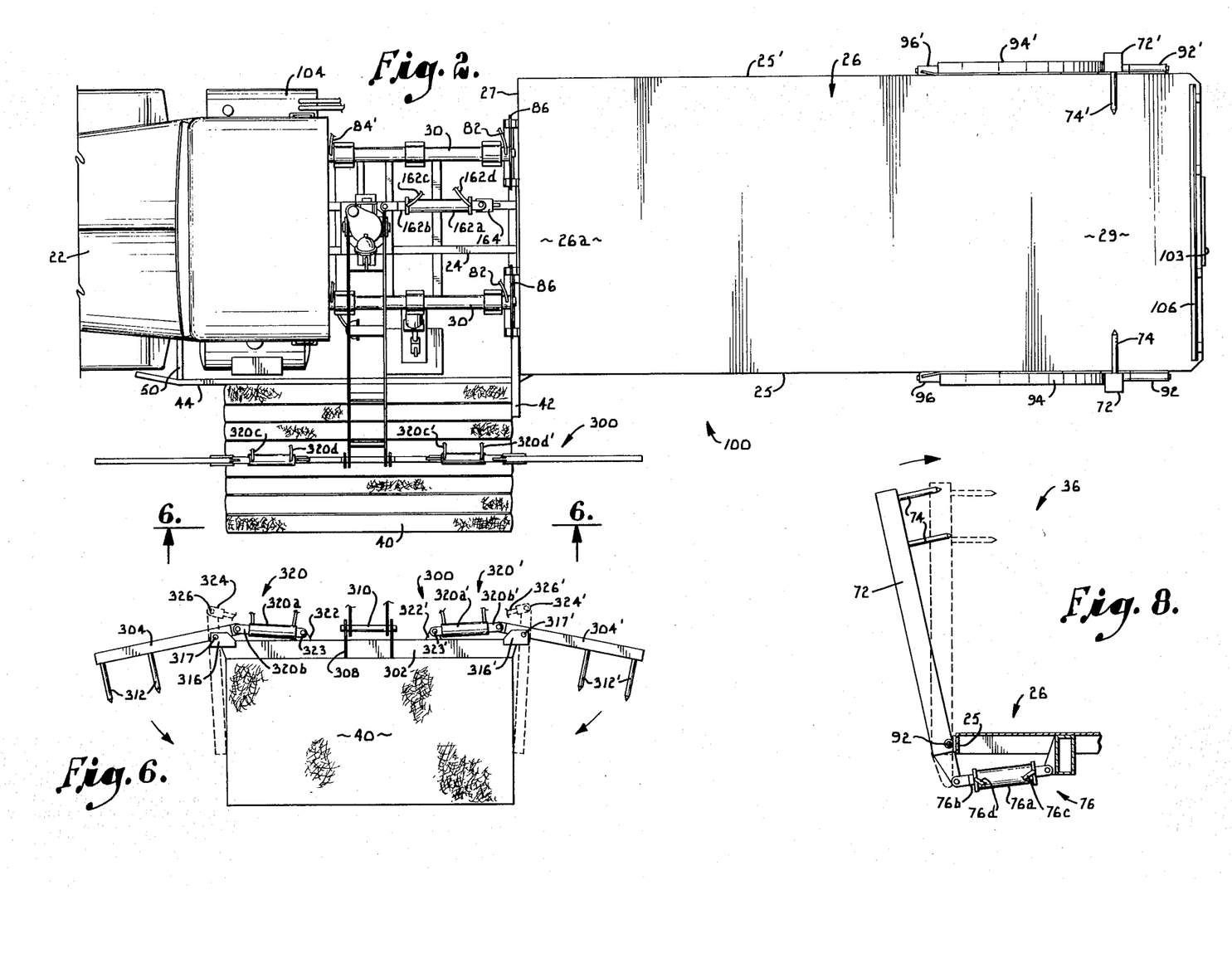
FIG. 2 is a top plan view, of the apparatus shown in FIG. 1, and illustrating the alignment of the vehicle proper and multistage hoist assembly with a ground-adjacent hay bale.
FIG. 6 is a partial elevation view, taken along lines 6—6 in FIG. 2, and showing in solid lines the grapple device of the multistage hoist assembly in a releasable mode and in phantom lines the seizure mode thereof relative to a hay bale.
FIG. 8 is a fragmentary sectional view, taken along lines 8—8 in FIG. 3, and showing in solid lines the releasable mode and in phantom lines the seizure mode of one side of the grapple assembly associated with the transport platform.

Mounted at the free end of hoist arm 260 is the grapple assembly 300. As shown in FIG. 6, the grapple assembly 300 comprises an elongated beam member 302 rotatably mounted to the outer end of hoist arm 260 about a bracketed 308 horizontal pin member 310. Pivotally mounted to the opposed ends of beam member 302 are seizure arms 304, 304' having inwardly extending prong members 312, 312' thereon. This pivotal mounting is accomplished by means of bracketed 316, 316' pin members 317, 317'. Pivotal movement of each arm member about its respective pin member 317, 317' is controlled by respective piston/cylinder combinations 320, 320'. Each cylinder 320a, 320a' is mounted atop the beam member 304 by means of a bracket 322, 322'/pin 323, 323' combination. The end of each piston 320b, 320b' is linked to the respective seizure arms 304, 304' by means of brackets 324, 324' with pin member 326, 326' extending therethrough. Fluid entry and withdrawal into the respective cylinders 320a, 320a' is operator-controlled by means of fluid lines 320c, 320d, 320c', 320d' in communication with fluid source 104. Entry and evacuation fluid into and from cylinder 320a, 320a' controls extension and withdrawal of the respective piston rods 320b, 320b' which moves the respective arms 304, 304' between releasable and seizure modes as shown in solid and phantom lines in FIG. 6.

Operation

Prior to operation, huge hay bales, approximately 4'W×4'H×8'L and weighing approximately 1,800 pounds have been formed in the field awaiting transport to a storage area. Prior to vehicle travel the multistaged hoist assembly 28 with the grapple assembly 300 thereon is positioned by the operator in a travel mode as shown in FIG. 1. This mode is presented by longitudinally moving the lift 218 until engagement of the lower notch 222 on lift 218 with the upstanding tooth member 216 on turntable 212. A subsequent operator-controlled rotation of turntable 212, as above described, rotates the support column 206, lift 218 and attached hoist arm 260 to the position shown in FIG. 1. The hoist arm 260 is so rotated until it is positioned in a generally normal relationship with the longitudinal centerline of platform 26.

The driver then maneuvers the vehicle 20 so that the respective arms 42 and 44 of the bale "try square" of alignment assembly 32 contact a lateral extending side (4') and longitudinal side (8') of the ground contacting hay bale 40. As these respective arms 42, 44 are aligned with the end wall 27 and side wall 25 of platform 26 the platform 26 is also in a relatively "square" relationship with the hay bale 40. This relationship cooperates with the relationship of the hoist assembly 28 to the platform 26, i.e. the longitudinal centerline of platform 26 runs therethrough, so that the vehicle 20, platform 26 and hoist assembly 28 are in proper alignment for subsequent pick up and loading of the hay bale 40 on platform 26.

Upon the above described "squaring" the grapple assembly 300, being in the releasable mode, is superiorly positioned relative to the ground adjacent hay bale 40. The operator pivots hoist arm 260 about the horizontal pin members 266, 268 until the beam member 302 contacts the top of the hay bale 40 as shown in FIG. 6. Operator movement of the seizure arms 304, 304' to the seizure mode, embeds the prongs 312, 312' in the end walls of bale 40 providing a seizure of the same. Prior to lifting the "seized" hay bale, the operator positions pod 158 of the stabilization assembly into a ground contacting position, as shown in solid lines in FIG. 7. Subsequently, the operator upwardly pivots the hoist arm 260 and the seized hay bale 40 through a vertical arc corresponding to an elevation of the seized hay bale 40 above the height of the platform 26. It is here pointed out that the ground contacting mode of the stabilization assembly 34 precludes undesirable lateral tipping of the vehicle chassis 24 during the aforesaid bale pick up and the to-be-described subsequent maneuvering of the seized bale onto the platform 26.

Operator rotation of the turntable 212 rotates the support column 206 and lift member 218 linked thereto, by engagement of the lower notch 222 with the upstanding tooth 216. Thus the resultant torque forces of the rotating column 206 are transferred to the lift member 218 which rotates the hoist arm 260 and swings the seized hay bale through a horizontal arc to a position above the loading area 26a of platform 26 as shown in FIG. 3. At this position, the operator pivots hoist arm 260 so that the hay bale 40 is displaced through a vertical arc until contact with the interiorly disposed platform 26 loading area 26a. Subsequently the seizure arms 304, 304' are swung to their releasable mode allowing the operator to rotate the hoist arm 260 to the above-described travel position. The stabilization assembly 34 is also placed in its releasable mode allowing for vehicle 20 travel.

Upon reaching the second hay bale 41 the vehicle is aligned, stabilization assembly 34 actuated and bale 41 seized and lifted in a manner identical to that above described. After seizure of hay bale 41 the operator first pivots the hoist arm 260 to elevate the seized hay bale 41 to a maximum allowable height and then longitudinally slides lift member 218 along the column 206 until the upper notch 220 engages the depending tooth member 210 of cap 208 such engagement defining the second stage of operation. During such longitudinal movement the alignment rod 259 precludes significant radial displacement of lift 218 away from column 206 and possible disengagement of the roller assemblies 240, 246 therewith due to the tremendous forces acting thereon resulting from the seized 1800 lb. hay bale. Turntable 212 is then rotated to concurrently rotate column 206 and lift 218 linked thereto. Concurrently the seized hay bale 41 is moved through a horizontal arc, relative to platform 26, to a position superior to the first hay bale 40 residing in the loading area 26a. Subsequently the operator pivots hoist arm 260 about pin members 266, 268 until contact of bale 41 with bale 40 is achieved corresponding to a stacking of hay bale 41 on hay bale 40. Subsequent to stacking the operator moves seizure arms 304, 304' to their releasable mode and the hoist arm 260 to its travel position, as shown in FIG. 1.

The operator then activates the hydraulic ram assemblies 30 causing contact of the hydraulic ram members 80 with the first hay bale 40. Extension of the ram member 80 moves the hay bale 40 and bale 41 stacked thereon to the rear 29 of the transport platform 26. Accordingly, loading area 26a is now free for subsequent stacking of first and second hay bales 40a, 41a in a manner identical to that above-described. Upon stacking therein, the hay bales 40a, 41a and antecedent stack 40, 41, are displaced to the rear of platform 26 by operation of the ram assembly 30.

Upon the first stack of hay bales 40, 41 approaching the rear of the transport platform 26 the guides 98 channel the hay bale 40 passing therethrough so that the end walls are parallel to the longitudinal walls 25 of platform 26. The operator then moves the grapple arms 72, 72' of grapple assembly 36 from their released position, as shown in solid lines in FIG. 8, to their seizure position (FIG. 1) so as to embed the prong members 74, 74' into the end walls of hay bale 41.

The above procedure of pick up, loading, stacking and rearward displacement of first and second hay bales is repeated until a full load capacity, four stacks as shown, of the transport platform 26 is achieved. Upon loading of the last stack of hay bales 40d, 41d the vehicle 20 is driven to the storage area. Upon arrival, the operator unfolds the hinge assemblies 62 so as to swing the bale-laden platform 26 from the horizontal loading position to the vertical position shown in FIG. 5. Stop flange 106 cooperates with the releasable clamping of bale 41 to bale 40 to preclude undesirable shifting of these hay bales 40, 41 during such swingable movement of platform 26. Accordingly, upon vertical disposition of platform 26 the first and second hay bales of each stack of hay bales are in a juxtaposed relationship which presents a vertical stack of hay bales having a height corresponding to the number of stacks of hay bales previously loaded thereon. Maneuvering of the vehicle 20 enables the resultant vertical stack to abut any previous vertical stacks 70 in the storage area, such maneuvering of the vertically disposed platform being enhanced by the ground contacting roller member 103.

Subsequently the seizure arms 72, 72' of grapple assembly 36 are swung to their releasable position and the vehicle 20 driven away therefrom. Roller member 103 also enhances rolling movement of the vertically disposed platform 26 away from the hay bale stack. The operator then moves hinge assemblies 62 to their collapsed mode which swings the platform 26 to its horizontal/loading position, as shown in FIG. 1. The operator then drives the vehicle 20 to the field for subsequent pick up, loading, stacking and transport of hay bales.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A bale loader comprising:
   a bale receiving platform;
   an upstanding support member adjacent said platform;
   a hoist arm having spaced-apart inner and outer ends;
   means for mounting said hoist arm to said support member in longitudinal movement along the extent thereof and in pivotal movement about a generally horizontal axis and in rotatable movement about an upright axis;
   said mounting means comprising:
      sleeve means configured to fit about said support member in longitudinal movement along the extent of said support member and in rotatable movement about said upright axis; and
      pivot means for mounting the inner end of said hoist arm to said sleeve means in said pivotal movement and in longitudinal and rotatable movement with said sleeve means to provide for said longitudinal, pivotal and rotatable movement of said mounted hoist arm;
   grapple means operably mounted to said outer end of said arm member for releasably seizing a hay bale;
   means for controlling said pivotal movement of said arm member to move said grapple means through a generally vertically disposed arc relative to said platform;
   means for controlling said rotatable movement of said sleeve means to move said arm member and grapple means through a generally horizontally disposed arc relative to said platform; and
   means for controlling said longitudinal movement of said sleeve means to move said arm member and grapple means between at least first and second vertically disposed stages of said controlled pivotal and rotatable movement to establish a multistage hoist having a first stage for picking up a first ground-adjacent hay bale and loading the same onto said platform and at least one subsequent stage for picking up a second ground-adjacent hay bale and stacking the same on said first hay bale previously loaded on said platform.

2. The apparatus as claimed in claim 1, wherein said longitudinal control means comprises:
   a cylinder;
   a reciprocating piston with attached rod associated with said cylinder;
   means for linking the end of said piston rod to said sleeve means; and
   fluid valve means for presenting a fluid pressure to said piston in a manner to move said rod and said sleeve means with hoist arm thereon in selectable longitudinal movement along the extent of said support member.

3. The apparatus as claimed in claim 1, wherein said pivotal control means comprises:
   a cylinder;
   a reciprocating piston with attached rod associated with said cylinder;
   means for linking the end of said piston rod to said hoist arm; and
   fluid valve means for presenting a fluid pressure to said piston in a manner to move said rod and selectably pivot said hoist arm linked thereto.

4. The apparatus as claimed in claim 1, wherein said rotatable control means comprises:
   a cylinder;
   a reciprocating piston with rod associated through said cylinder;
   means for linking the end of said piston rod to said sleeve means; and
   fluid valve means for presenting a fluid pressure to said piston in a manner to move said rod and selectably rotate said linked sleeve means with hoist arm thereon.

5. The apparatus as claimed in claim 1, wherein said rotatable control means comprises:
   means for rotating said support member about a longitudinal axis passing therethrough; and
   means for transmitting said rotation of said support member to said sleeve means and said hoist arm attached thereto.

6. The apparatus as claimed in claim 5, wherein said means for rotating said support member comprises:
   a cylinder;
   a reciprocating piston with attached rod associated with said cylinder;
   fluid valve means for presenting a fluid pressure to said piston in a manner to selectably move said piston with rod; and
   linkage means for communicating the reciprocating motion of said rod to said support member in a manner to provide rotation thereto.

7. The apparatus as claimed in claim 6, wherein said linkage means comprises:

a turntable rotatable about an axis passing therethrough;

means for fastening said turntable to said upstanding support member for a concurrent rotation therewith; and means for connecting the end of said piston rod to said turntable whereby said reciprocating motion of said rod rotates said turntable and said support member in clockwise or counterclockwise directions about said turntable axis.

8. The apparatus as claimed in claim 5, wherein said transmission means comprises:

at least first and second lug means selectably located along the extent of said support member; and at least one aperture in said sleeve means for engaging at least one of said lug means on said support member whereby rotation of said support member concurrently rotates said sleeve means with hoist arm mounted thereto.

9. The apparatus as claimed in claim 8, wherein said first and second lug means are adjacent the respective ends of said support member to there define said first and second vertically disposed stages of said hoist arm.

10. The apparatus as claimed in claim 1, further comprising:

a roller bearing; and means for mounting said roller bearing to said sleeve means in longitudinal movement therewith and in rolling contact with said upstanding support member to enhance said longitudinal movement of said sleeve member therealong.

11. The apparatus as claimed in claim 10, further comprising:

an alignment rod;

means for mounting said alignment rod in a parallel relationship with said support member with said sleeve means interposed therebetween, said rod precluding displacement of said roller bearing from said contact position during said longitudinal movement of said sleeve means.

12. The apparatus as claimed in claim 1, further including a ram assembly comprising:

a cylinder;

a reciprocating ram member associated with said cylinder;

means for mounting said cylinder and associated ram adjacent said platform and a first hay bale loaded thereon; and fluid valve means for presenting a fluid pressure to move said ram member into contact with said first hay bale for displacement of said first hay bale along said platform to a position allowing for a loading and stacking of subsequent first and second ground-adjacent hay bales thereon.

13. The apparatus as claimed in claim 1, wherein said platform further comprises:

a frame member for supporting said platform in a horizontal position;

means for pivotally mounting said platform to said frame member in swingable movement through a vertically disposed arc relative to said frame member;

hinge means bridging said frame member and said platform member and having a first mode corresponding to a horizontal position of said platform and a second mode corresponding to a vertical position of said frame member; and means for moving said hinge means between said first and second modes to present said corresponding platform horizontal and vertical positions with said latter position gravitationally unloading said first and second stacked hay bales on said platform.

14. The apparatus as claimed in claim 13, further comprising:

means for precluding displacement of at least said first loaded hay bale during said platform swingable movement; and means for releasably clamping at least said second hay bale stacked atop said first loaded hay bale during said platform swingable movement to juxtapose said plurality of first and second hay bales stacked on said platform at the vertical position thereof.

15. The apparatus as claimed in claim 14, wherein said preclusion means comprises a flange member projecting from said platform for contact with said first hay bale during said platform swingable movement to preclude displacement thereof.

16. The apparatus as claimed in claim 14, wherein said clamping means comprises:

prong means for piercing at least said second hay bale stacked atop said first hay bale;

means for mounting said prong means to said platform for movement between a first mode piercing said hay bale and a second mode withdrawn therefrom; and means for controlling said movement of said mounting means between said first and second modes with said piercing mode precluding displacement of said second hay bale relative to said first hay bale positioned therebelow.

17. The apparatus as claimed in claim 16, wherein said mounting means comprises:

at least one arm member having longitudinally spaced-apart first and second ends thereof;

means for mounting said prong means to said second end of said arm member; and means for pivotally mounting said arm member to said platform in swingable movement relative thereto between said piercing and withdrawal modes.

18. The apparatus as claimed in claim 1, further including an alignment assembly comprising:

a first arm member laterally extending to the outboard side of said bale receiving platform and running normal to the longitudinal axis of said platform;

a second longitudinally extending arm member positioned to the outboard side of said platform and running parallel to the longitudinal axis of said platform and disposed in a normal relationship to said first arm member to present a try square; and means for positioning said try square into a squaring relationship with a ground-adjacent bale whereby to relatively square said platform with the same.

19. The apparatus as claimed in claim 1, wherein said upstanding support member is cylindrical in configuration and further comprising a second support member nested within said upstanding support member whereby to rigidly support said upstanding support member and said hoist arm mounted thereto.

20. The apparatus as claimed in claim 19, further comprising:

a roller bearing; and means for mounting said roller bearing to said sleeve means in longitudinal movement therewith and in rolling contact with said upstanding support member to enhance said longitudinal movement of said sleeve member therealong.

21. The apparatus as claimed in claim 20, further comprising:
an alignment rod; and
means for mounting said alignment rod in a parallel relationship with said support member with said sleeve means interposed therebetween, said rod precluding displacement of said roller bearing from said contact position during said longitudinal movement of said sleeve means.

22. A bale loader comprising:
a bale receiving platform;
an upstanding support member adjacent said platform, said upstanding support member including a second support member nested within said upstanding support member whereby to rigidly support said upstanding support;
a hoist arm having spaced-apart inner and outer ends;
means for mounting said hoist arm to said support member in longitudinal movement along the extent thereof and in pivotal movement about a generally horizontal axis and in rotatable movement about an upright axis;
grapple means operably mounted to said outer end for releasably seizing a hay bale;
means for controlling said pivotal movement of said arm member to move said grapple means through a generally vertically disposed arc relative to said platform;
means for controlling said rotatable movement of said arm member to move said grapple means through a generally horizontally disposed arc relative to said platform; and
means for controlling said longitudinal movement of said arm member to move said arm member and grapple means attached thereto between at least first and second vertically disposed stages of said controlled pivotal and rotatable movement to establish a multistage hoist having a first stage for picking up a first ground-adjacent hay bale and loading the same onto said platform and at least one subsequent stage for picking up a second ground-adjacent hay bale and stacking the same on said first hay bale previously loaded on said platform.

23. The apparatus as claimed in claim 22, wherein said mounting means comprises:
sleeve means configured to fit about said upstanding support member in said longitudinal and rotatable movement; and
pivot means for mounting the inner end of said hoist arm to said sleeve means in said pivotal movement and in longitudinal and rotatable movement with said sleeve means to provide for said longitudinal, pivotal and rotatable movement of said attached hoist arm.

24. The apparatus as claimed in claim 23, further comprising:
a roller bearing; and
means for mounting said roller bearing to said sleeve means in longitudinal movement therewith and in rolling contact with said upstanding support member to enhance said longitudinal movement of said sleeve member therealong.

25. The apparatus as claimed in claim 24, further comprising:
an alignment rod; and
means for mounting said alignment rod in a parallel relationship with said support member with said sleeve means interposed therebetween, said rod precluding displacement of said roller bearing from said contact position during said longitudinal movement of said sleeve means.

26. A bale loader comprising:
a bale receiving platform comprising:
a frame member for supporting said platform in a horizontal position;
means for pivotally mounting said platform to said frame member in swingable movement through a vertically disposed arc relative to said frame member;
hinge means bridging said frame member and said platform member and having a first mode corresponding to a horizontal position of said platform and a second mode corresponding to a vertical position of said frame member; and
means for moving said hinge means between said first and second modes to present said corresponding platform horizontal and vertical positions with said latter position gravitationally unloading said hay bales stacked on said platform;
an upstanding support member adjacent said platform;
a hoist arm having spaced-apart inner and outer ends;
means for mounting said hoist arm to said support member in longitudinal movement along the extent thereof and in pivotal movement about a generally horizontal axis and in rotatable movement about an upright axis;
grapple means operably mounted to said outer end of said hoist arm for releasably seizing a hay bale;
means for controlling said pivotal movement of said arm member to move said grapple means through a generally vertically disposed arc relative to said platform;
means for controlling said rotatable movement of said arm member to move said grapple means through a generally horizontally disposed arc relative to said platform; and
means for controlling said longitudinal movement of said arm member to move said grapple means between at least first and second vertically disposed stages of said controlled pivotal and rotatable movement to establish a multistage hoist having a first stage for picking up a first ground-adjacent hay bale and loading the same onto said platform and at least one subsequent stage for picking up a second ground-adjacent hay bale and stacking the same on said first hay bale previously loaded on said platform;
means for precluding displacement of at least said first loaded hay bale during said platform swingable movement;
means for releasably clamping at least said second hay bale stacked atop said first loaded hay bale during said platform swingable movement comprising:
prong means for piercing at least said second hay bale stacked atop said first hay bale;
means for mounting said prong means to said platform for movement between a first mode piercing said hay bale and a second mode withdrawn therefrom; and means for controlling said movement of said mounting means between said first and second modes with said piercing mode precluding displacement of said second hay bale relative to said first hay bale positioned therebelow during said swingable movement whereby to juxtapose the position of said plurality of first and second hay bales stacked on said platform upon reaching the vertical position thereof.

27. The apparatus as claimed in claim 26 wherein said preclusion means comprises a flange member projecting from said platform for contact with said first hay bale during said platform swingable movement to preclude displacement thereof.

* * * * *